C. F. Martine,
Sofa Bedstead,
No. 336.
Reissued Dec. 25, 1855.
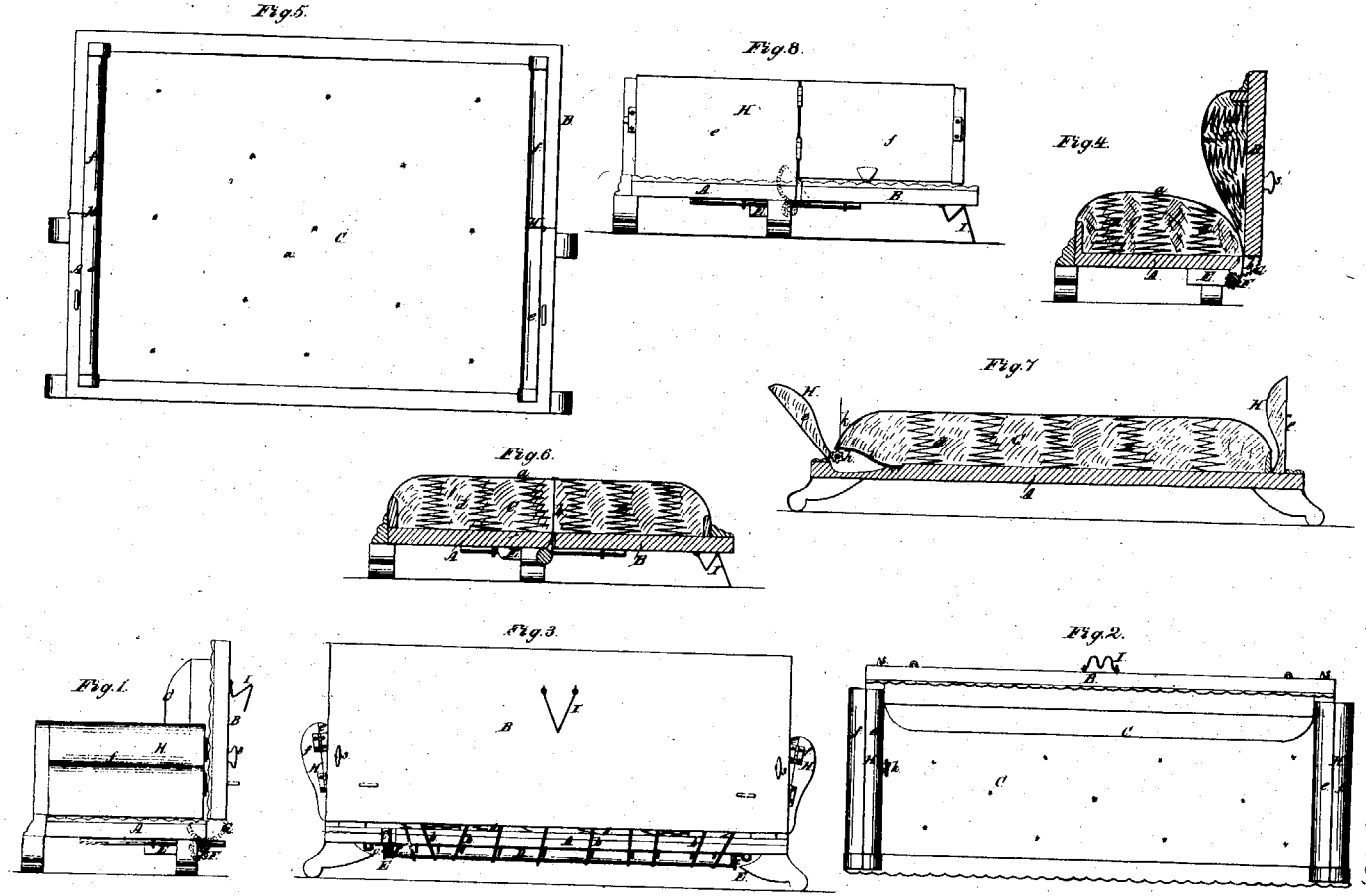

UNITED STATES PATENT OFFICE.

CHARLES F. MARTINE, OF BOSTON, MASSACHUSETTS.

IMPROVEMENT IN SOFA-BEDSTEADS.

Specification forming part of Letters Patent No. 11,026, dated June 6, 1854; Reissue No. 336, dated December 25, 1855.

*To all whom it may concern:*

Be it known that I, CHARLES F. MARTINE, of Boston, in the county of Suffolk and State of Massachusetts, have invented a new or Improved Sofa-Bedstead; and I hereby declare that the same is fully described and represented in the following specification and the accompanying drawings, letters, figures, and references thereof.

Of the said drawings, Figure 1 represents a side elevation, and Fig. 2 a top view, of my improved sofa bedstead as it appears when folded together in the form of a sofa. Fig. 3 is a rear elevation of it, and Fig. 4 is a transverse and central section of it. Fig. 5 is a top view of it as it appears when unfolded or reduced to the form of a bedstead. Fig. 6 is a transverse section of the same; and Fig. 7 is a longitudinal section, exhibiting the foot-board or arm as turned downward, the said section being taken through the machinery by which said foot-board or arm is maintained in an inclined position.

In the drawings above mentioned, A represents the main frame or base of the sofa, it having a frame or back, B, applied to one side of it by means of hinges, so as to be capable of being turned from an upright down into a horizontal position, or vice versa, as occasion may require. The said two frames A and B are provided with a spring bed or mattress, C, arranged upon them, as seen in the drawings.

To the middle of the covering *a* of the mattress a series of cords, *b b b*, is affixed, each cord being attached thereto by one of its ends. The opposite end of each of the cords is affixed to the end of a long windlass, D, which is applied to the under side of the frame A, and at or near the rear edge of the same, as seen in the drawings, the journals *c c* of said windlass being supported by and so as to revolve in stationary bearing-plates E E, affixed to the under side of the frame A.

There is a pinion-gear, F, affixed to one end of the windlass-barrel D, and there is a sectoral gear, G, affixed to the back-frame B, and made to engage with the pinion-gear, and so arranged that, while the back B is being turned from an upright down into a horizontal position, it (the said sectoral gear) shall produce a revolution or rotation of the pinion-gear, and of course the windlass-barrel, and thereby unwind the cords from the windlass-barrel, so as to permit the sacking or covering *a* to be thrown upward along its middle, such elevation of it being effected by the extension of the springs *d d d* of said sacking. When the back B is elevated into an upright position, the windlass will be put in rotation in an opposite direction, so as to draw the sacking toward the vertex of the angle of the back and seat, and thus cause the spring-mattress to have the appearance of two spring-cushions, one applied to the back and the other to the seat, as in the common sofa-bedstead. When there is a spring mattress or cushion applied to the back and one to the seat of the sofa, so that they shall be separate one from another, there will always be a joint or space between them when they are extended horizontally, which will be productive of more or less inconvenience to a person when reposing on the bed, and it is the object of my invention to dispense with such joint and its inconveniences.

I construct each of the arms H H of the seat or base frame in two parts, *e f*, as seen in the drawings, the inner part being fastened to the base A, while the two parts *e f* are hinged together at their rear ends, so as to enable the part *f* to be turned around through a semicircle, and into line with the part *e*, as seen in Fig. 5, the hinges being seen in said figure, and also in Fig. 8, which is an end view of the bedstead when in an unfolded state.

In order to support the rear part of the back B, when said back is turned down into a horizontal position, there may be applied to said back a leg, I, which may be hinged to it, so as to be capable of being turned into the position as seen in Fig. 6, or into that denoted in the rear elevation of the bedstead, as seen in Fig. 3.

The part *e* of one of the arms H may be so hinged to the base A as to be capable of being turned from an upright down into an inclined position, and there may be applied to such part a sectoral or toothed gear, *h*, while a spring-click or retaining-pawl, *i*, may be applied to the base A and made to work into the teeth of the gear *h*, and so as to hold the arm *e* in any inclined position in which it may be placed. From said pawl a cord or wire, *k*, should extend upward, so as to be conveniently reached by a person, and to enable him to lift the pawl out of engagement with the ratchet-gear. When the part *e* of the arm H is thus depressed, the part *f* connected with it will be similarly turned down, it being made to rest at its lower edge on the back B. By such means the bedstead may be extended lengthwise, the bolster and pillows being placed, if desirable to do so, on the arm so turned downward. When the back is elevated into an upright position, it may be maintained thereat by means of screws *s s*, passed through it and screwed into the parts H H.

What I claim as my invention, and desire to secure by Letters Patent, is—

Drawing down or depressing the cushion at the joint between the back and seat by means of the cords *b*, or their equivalents, connected automatically with the seat A and back B, for the purpose herein set forth.

CHAS. F. MARTINE.

Witnesses:
SAM. COOPER,
JOHN S. CLOW.